United States Patent [19]
Kuszleyko

[11] 3,860,897
[45] Jan. 14, 1975

[54] WINDING RECONNECTION ARRANGEMENT FOR A WELDING APPARATUS

[75] Inventor: Ryszard Kuszleyko, Gliwice, Poland

[73] Assignee: Instytut Spawalnictwa, Gliwice, Poland

[22] Filed: Aug. 4, 1971

[21] Appl. No.: 168,985

[30] Foreign Application Priority Data
Aug. 13, 1970 Poland .................................. 142671

[52] U.S. Cl. ................................. 336/147, 323/49
[51] Int. Cl. ............................................ H01f 21/12
[58] Field of Search ....... 336/145, 146, 147; 323/49

[56] References Cited
UNITED STATES PATENTS

| | | | |
|---|---|---|---|
| 529,152 | 11/1894 | Zikermann | 323/49 |
| 728,970 | 5/1903 | Peck | 323/49 |
| 1,896,397 | 2/1933 | Gay | 323/49 |

*Primary Examiner*—Thomas J. Kozma
*Attorney, Agent, or Firm*—Karl F. Ross; Herbert Dubno

[57] ABSTRACT

A power-circuit arrangement for a welder has a transformer connected between the line-current source and the welding load with a secondary connected in series with a transductor (magnetic amplifier). The primary of the transformer has at least two windings each connected in series with respective current-carrying windings of the transductor while the secondary of the transformer has at least two windings equivalent to the primary windings. Switch means is provided for connecting the primary windings in parallel and the secondary windings in parallel and for connecting the transductor windings in parallel with one another but in series with the parallel connected primary windings in one position of the switch means. In the other position of the switch means, the primary windings are connected in series, the secondary windings are connected in series and the transductor windings lie individually in series with the respective primary windings.

2 Claims, 1 Drawing Figure

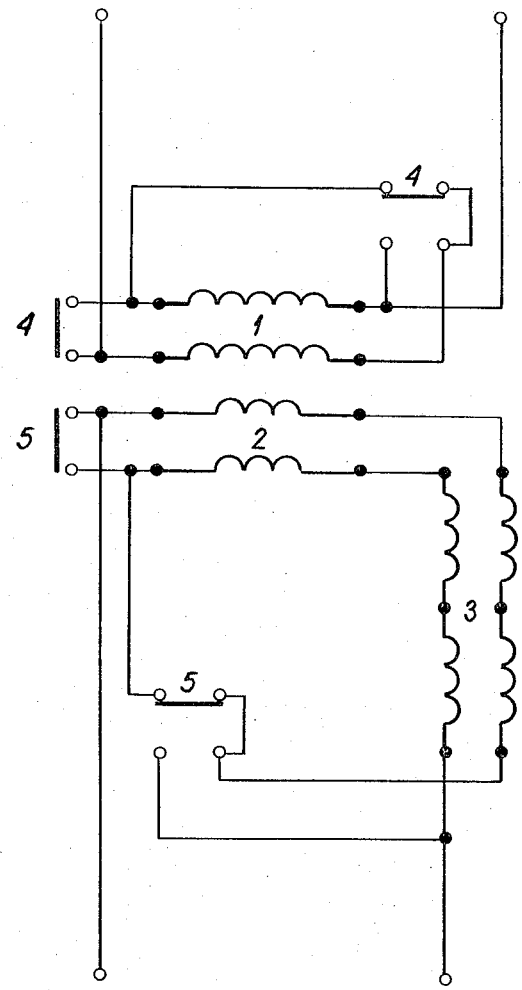

3,860,897

WINDING RECONNECTION ARRANGEMENT FOR A WELDING APPARATUS

FIELD OF THE INVENTION

The subject of the invention is an arrangement for reconnecting the windings of a welding apparatus with a single or multi-phase power circuit formed in part phase by a transformer and a transductor, or by a transformer with an associated transductor. By reconnection of the winding of the welding set the range of current required for a welding process can be changed.

BACKGROUND OF THE INVENTION

Division into ranges of the entire current magnitude for welding operations is a well known and widely used method for welding power sources. By employing this method a saving in welding materials is obtained, and there is a reduced rate of variation of welding current when adjusting the controller. When the main elements of the power circuit of a converter include a transformer and a transductor, changing of the range can be obtained by re-switching the transductor windings. Known, for example, are systems where additional sections of the transductor windings can be switched-in, or a section is re-switched from series into parallel connection. The last solution is, however, impractical when the transductor windings form one unit with the windings of the transformer (e.g., as a double coil). Then the change from series into parallel connection would result in the reduction of the transformer secondary as well and thus cause a reduction of the open-circuit voltage which is unacceptable for metal arc welding.

Most frequently the transformer in the power circuit is shaped as a single, nonsectioned, monophase or three-phase element. Welding power sources also are known where the transformer is divided into two elements connected in series or in parallel at the primary and, irrespective of this, in series or in parallel at the secondary. Another known method consists in partitioning the transformer windings into sections which are switched on as required. However, the system of connections at the primary has not so far been designed as an adjustable system depending on switching the connections in the power circuit at the secondary side of the converter, the secondary side being formed as a unit consisting of a transformer secondary and of the power winding of a transductor.

OBJECT OF THE INVENTION

The object of the present invention is to make available the benefits which arise from adapting the connection at the primary side to the connection selected at any time by the operator at the secondary side. The effect is the reduction of the magnetizing current due to the increase in the number of primary turns when, at the secondary side, the operator has selected a connection suitable for small loads.

SUMMARY OF THE INVENTION

This object has been attained by dividing the windings of the power circuit both at the secondary and primary side into two sections which, for small welding currents, are connected in series both at the primary and the secondary side, while for high welding currents these sections are connected in parallel both at the primary and the secondary side.

DESCRIPTION OF THE DRAWING

This object and others will become apparent more readily in the following description, reference being made to the accompanying drawing in which the sole FIGURE is a circuit diagram illustrating the invention.

SPECIFIC DESCRIPTION

The system designed according to the invention is illustrated in the enclosed drawing. Re-connection takes place by means of switches 4 and 5 which can be separate or mounted as a unit on a common pin. The position of the contacts illustrated in the drawing corresponds to series connection of the sections of primary winding 1 and to series connection of the paths consisting of sections of the secondary winding 2 of the transformer and of the sections of the power winding 3 of the transductor. The control winding of the transductor is omitted in the drawing as are other elements having no effect on the nature of the invention. The series connection of the winding path at the secondary side was selected to provide small welding currents. The series connection of the sections of primary winding 1 has been adapted correspondingly. If a range of high currents is required, the winding paths at the secondary side will be connected in parallel, and also adapted to that connection will be a parallel connection of the sections of the primary winding. The range of high currents will be selected by putting the switches 4 and 5 in the second of their possible positions.

For both ranges the same open-circuit voltage is obtained, while for the range of the low currents the no-load losses are significantly lower. This is because the losses in the core do change approximately with the square of the induction which is by half less when the sections are connected in series.

The invented reconnection arrangement can be used in known systems conbining the transformer and the transductor in a single construction unit, so that the alternating component of the transductor magnetic flux is an element of the transformer leakage flux. The transformer is subdivided then into members connected with various networks of the transductor magnetic circuit while the secondary or primary winding can be a common one for the transformer and the transductor. In such a case also possible is a mutual matching, at both sides of the transformer, of the in-series and the in-parallel connections of separate sections as discussed above. Also possible is however, the mutual matching, at both sides of the transformer, of the in-series and the in-parallel connections of separate members. The same results as those discussed above are then obtained the transductor changing from series to parallel.

The invented reconnection arrangement can be used both for single- and multi-phase systems.

What we claim is:

1. A power circuit for a welding apparatus, comprising a transformer connectable between a line-current source and a welding circuit load; a transductor connected in circuit with said transformer, said transformer having at least two equivalent primary windings connectable across said source and forming a first winding set and at least two equivalent secondary windings connectable across said load and inductively coupled with said primary windings while forming a second winding set, said transductor having at least two current-carrying windings connectable in circuit with the windings of one of said sets; and switch means having a first position electrically connecting said primary windings in parallel, said secondary windings in parallel and said current-carrying windings in parallel with one another and in series with the parallel connected windings of said one of said sets, and a second position electrically connecting said primary windings in series, said secondary windings in series, and said current-carry windings in series with said windings of said one of said sets.

2. A welding power source comprising a transformer having a pair of primary windings; switch means for connecting said primary windings selectively in series and in parallel to an alternating-current source, said transformer having a pair of secondary windings; transductor having a pair of power windings each connected in series with a respective secondary winding of said transformer; and switch means for selectively connecting one side of each of said secondary windings to one side of a welding set and a side of both said power windings in common to the other side of said welding set, and for connecting said secondary and power windings in series across said welding set in another position of the last-mentioned switch means.

* * * * *